Sept. 23, 1969    M. G. LEONARD    3,469,223
CAST BUSHING FOR CONNECTING A HIGH VOLTAGE AND HIGH CURRENT TO
ELECTRICAL APPARATUS LOCATED IN A METAL CASING OR TANK
Filed June 26, 1968
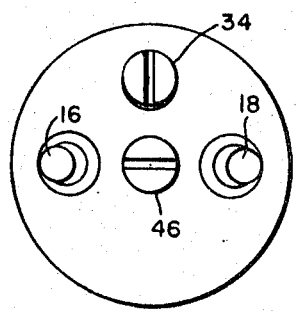
FIG. 3
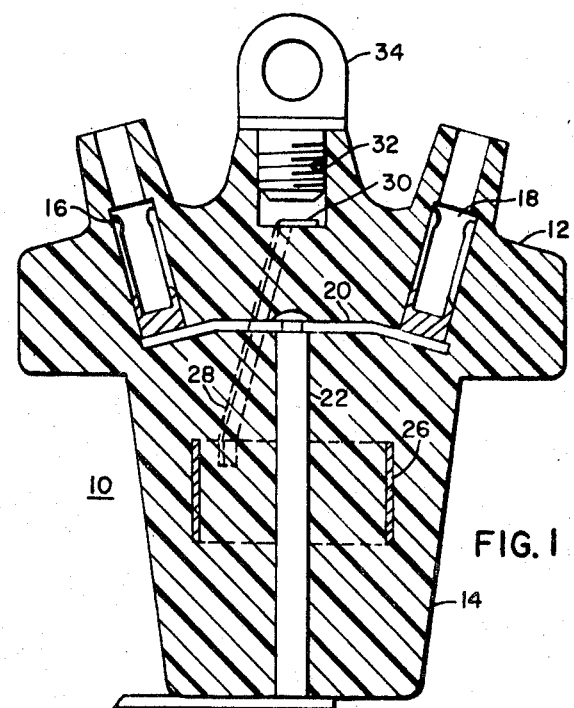
FIG. 1
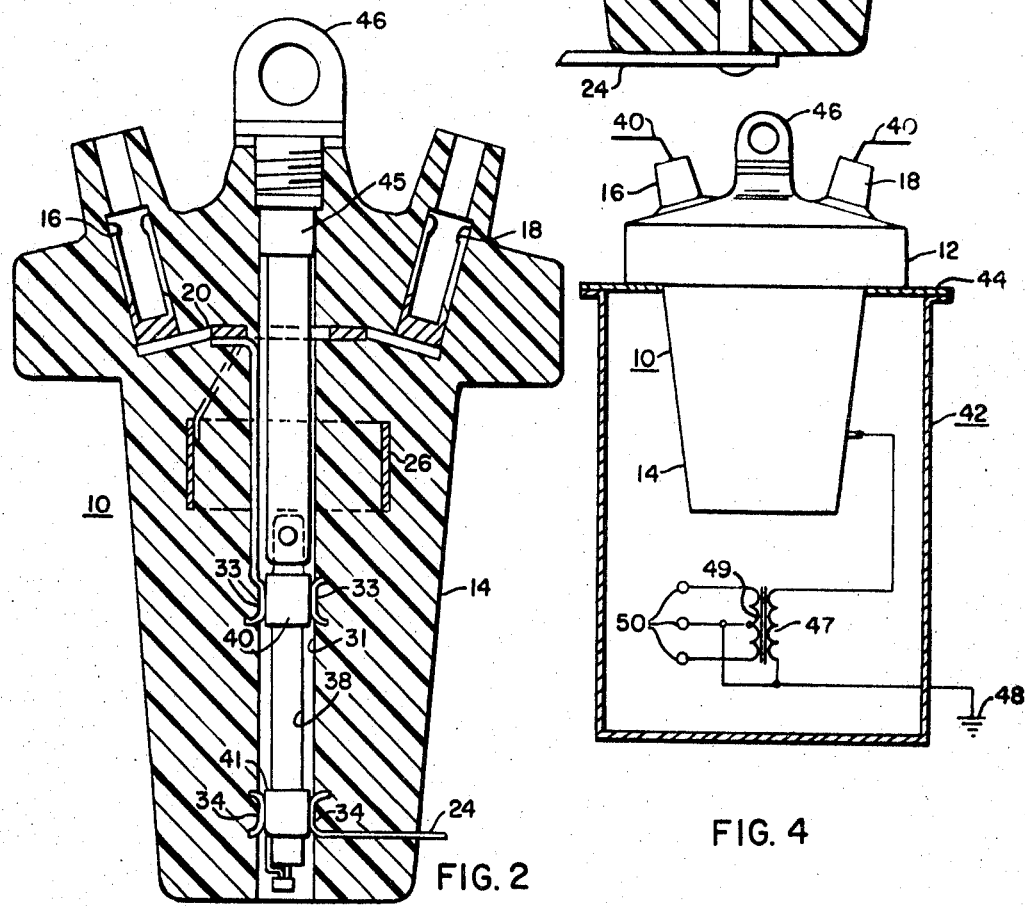
FIG. 2
FIG. 4

United States Patent Office

3,469,223
Patented Sept. 23, 1969

---

3,469,223
CAST BUSHING FOR CONNECTING A HIGH VOLTAGE AND HIGH CURRENT TO ELECTRICAL APPARATUS LOCATED IN A METAL CASING OR TANK
Merrill G. Leonard, Fowler, Ohio, assignor to Westinghouse Electric Corporation, Pittsburgh, Pa., a corporation of Pennsylvania
Filed June 26, 1968, Ser. No. 740,181
Int. Cl. H01h 85/02, 85/20
U.S. Cl. 337—202                    2 Claims

ABSTRACT OF THE DISCLOSURE

A cast bushing for connecting a high voltage and high current electrical line to electrical apparatus housed in a metallic casing or tank. The bushing comprises a flange portion located outside the casing and a body portion located inside the casing. The high current circuit is isolated entirely in the flange portion of the bushing so that the high current does not pass through the wall of the casing. Only the current of the apparatus housed in the casing passes through the wall of the casing. The bushing has a central continuous opening through the flange and the body portions for receiving a replaceable fuse for protecting the electrical apparatus in the casing.

BACKGROUND OF THE INVENTION

Field of the invention

This invention relates to a cast high-voltage and high-current bushing, for connecting a high voltage (of the order of 7200 volts) and high current (of the order of 200 amps.) power supply line, hereafter called a "line" to a plurality of distribution transformers connected in a loop circuit arrangement.

DESCRIPTION OF THE PRIOR ART

In some transformer installations, such as pad mounted or submersible transformer installations, a number of transformers are connected to a single high-voltage feeder. In such an installation it is common practice to run the high voltage circuit through the casing or cover of the transformer and out again for the reason that it is not permissible to have any exposed hardware outside the casing, nor any point where the insulation strength falls below an acceptable standard. This arrangement is expensive because it requires two fully insulated bushings where the two leads pass through the casing. It may also be undesirable because if the casing is made of steel and if the line current is high, of the order of 200 amps. or more, a certain amount of loss will occur because of the alternating magnetic flux in the wall of the casing. In extreme cases this could cause heating, with deleterious effects on finishes or gaskets or insulation. Moreover, such installations make no provision for a removable fuse, and if this is desired, the design becomes considerably more complicated.

This invention eliminates these objections to the prior art by providing a single bushing for the line and fuse; wherein, the line current does not pass through the casing walls and only the transformer current which is much less than the line current, in the order of 25 amps., is conducted through the casing walls. This invention also eliminates the extra expense of a separately mounted fuse.

SUMMARY

This invention provides a bushing cast from a suitable resin, such as filled epoxy, rubber or some other suitable material that may be readily cast, for connecting a line to an electrical apparatus, such as a distribution transformer, located in a metal casing. More specifically the bushing is intended for connecting a line in a loop arrangement of a plurality of distribution transformers. It is common practice to connect a line into a distribution transformer casing through a first bushing and bring the line out of the transformer casing through another bushing. This arrangement requires two expensive bushings and the entire line current passes through the casing wall twice. This arrangement is expensive and the high current passing through the metal casing may cause undesirable loss levels, which could cause heating and consequential damage. The bushing of the present invention comprises an integral flange and body portion. The flange portion is located outside the transformer casing and the body portion extends through the casing wall and is located inside the casing. The flange portion is equipped with first and second terminal means for connecting a line to the bushing. The first and second terminal means are connected together by a conductor located entirely within the flange portion of the bushing which is entirely outside the transformer casing. With this arrangement the line current does not enter the transformer casing.

A conductor is attached to the conductor connecting the first and second line terminals and extends down through a central opening in the body portion of the bushing for connecting the line to the windings of a transformer located in the tank. This conductor is required to carry only the transformer current which is much less than the line current.

A cylindrical voltage pick-up device is molded into the body portion of the bushing. The pick-up device surrounds the conductor for connecting to the transformer windings. A conductor leads from this pick-up device to a test point on the flange portion of the bushing, which is located outside the casing. This arrangement permits service personnel to check the transformer from outside the casing to determine whether high voltage is present on the line.

One embodiment of the bushing of this invention has a centrally located opening extending entirely through the flange and body portion of the bushing. A fuse is located in this opening and connects between the conductor connecting the first and second line terminals and the circuit connecting to the transformer windings located in the casing. The fuse is insertable and removable through an opening in the flange portion of the bushing, exteriorly of the transformer casing. This arrangement eliminates the necessity for separate mounting hardware and insulation for installing the fuse through the transformer casing.

BRIEF DESCRIPTION OF THE DRAWINGS

FIGURE 1 is a sectional view of one embodiment of the invention;
FIGURE 2 is a sectional view of a second embodiment;
FIGURE 3 is a top view drawn to a reduced scale of FIGURE 2; and
FIGURE 4 is a schematic diagram illustrating how the bushing of this invention may be installed on a transformer.

DESCRIPTION OF THE PREFERRED EMBODIMENTS

Throughout the description which follows like reference characters represent like elements in the various figures of the drawings.

FIGURE 1 of the drawings illustrates one embodiment of a cast bushing 10 provided by this invention. The bushing 10 comprises a flange portion 12 and a main body portion 14. When the bushing is used to connect a line to electrical apparatus, such as a distribution transformer located in a casing, the flange portion 12 of the bushing 10 will be located outside of the casing and the body portion 14 of the bushing 10 will be located inside of the casing. First and second female contact members 16 and 18 are molded into the flange portion 12 of the bushing 10. A line may be connected to the bushing 10 by plugging male contact members (not shown) into the female contact members 16 and 18. A conducting member 20 which is molded into the flange portion 12 of the bushing 10 electrically connects the female contact members 16 and 18 in series circuit relationship. A conducting element 22 is electrically connected to the circuit element 20 and extends downwardly through the central portion of the body portion 14 of the bushing 10 and projects from the lower end of the bushing 10. A conductor 24 is attached to the lower end of the conducting member 22. The conductor 24 may be connected to a fuse member, which in turn may be connected to the windings of a distribution transformer, or if it is not desired to fuse the windings of the distribution transformer the conductor 24 may be connected directly to the windings of a transformer.

A voltage pick-up shield 26 is molded into the body portion 14 of the bushing 10. The member 26 is of cylindrical shape and it surrounds the conductor 22. A conductor 28 is attached to the voltage pick-up shield 26, and the conductor 26 extends into the flange portion 12 of the bushing 10 and terminates at a test point 30. The test point 30 is located in a well or depression 32 which is closed by means of an eye bolt 34. When it is desired to test to determine whether or not the electrical apparatus is energized the eye bolt 34 is removed and the service personnel may test for energization of the apparatus by bringing a test light close to the test point 30. If the apparatus is energized the light will glow to indicate that the apparatus is energized. If the apparatus is not energized the test light will not glow. It is seen from FIGURE 1 that when a line is attached to the terminals 16 and 18 that the line current flows through the terminal 16, the conductor 20, and through the terminal 18. The line current is confined entirely to the flange portion of the bushing and does not pass through the casing wall.

FIGURE 2 illustrates a second embodiment of this invention, wherein a fuse is provided centrally of the bushing for fusing the electrical apparatus attached to the line. In all other respects the embodiment of FIGURE 2 is substantially the same as the embodiment of FIGURE 1. In the embodiment of FIGURE 2 a central opening 31 is provided continuously through the flange portion 12 and the body portion 14 of the bushing 10. A pair of brush type electrical contacts 33 are attached to the conductor 20. It is emphasized that the conductor 20 is continuous and is not broken or open circuited by the brush contacts 33. A second pair of brush type electrical contacts 34 are molded into the body portion 14 of the fuse. A conductor 24 for connecting to the electrical apparatus with which the bushing 10 is used is connected to the fuse contacts 34.

A fuse 38 having contact ferrules 40 and 42 is connected to a fuse holder 45. The fuse 38 is inserted into the opening 31 and when an eye bolt 46 is screwed down tight against the flange portion 12 of the bushing 10 the fuse ferrules 40 and 41 make electrical contact with the fuse contacts 33 and 34 to complete an electrical circuit from the conductor 20 down through the fuse 38 and the conductor 24 to the electrical apparatus associated with the bushing. The fuse 38 may be inserted or removed from the opening 31 merely by removing the eye bolt 46 which is attached to and operates the fuse holder 45. It is seen from this description that the line current passes through the contact 16, the conductor 20 and the contact 18, but does not pass down through the fuse 38 and into the apparatus connected to the conductor 24. When a fuse blows the entire system is not disrupted since there is always a continuous circuit through the contact 16, the conductor 20 and the contact 18. This means that when a fault occurs on one transformer in a loop circuit arrangement that the rest of the transformers of the circuit are not affected. To remedy the fault it is merely necessary to correct the faulted transformer and reinsert a new fuse 38 into the opening 31.

FIGURE 3 is a top view of the apparatus shown in FIGURE 2, drawn to a reduced scale, and illustrates the relative position of the eye bolt 46 of the fuse holder and the eye bolt 34 of the test point 30.

FIGURE 4 is a schematic arrangement showing how the bushings of FIGURES 1 and 2 may be utilized to connect a line 40 in a loop circuit arrangement to a plurality of distribution transformers. As seen from FIGURE 4 the bushing 10 is mounted on the cover 44 of a transformer 42 with the flange portion 12 of the bushing 10 entirely outside of the casing 42 and with the body portion 14 of the bushing entirely within the transformer casing 42. The line 40 enters as the terminal 16 passes through the internal conductor 20 to the terminal 18 and proceeds on to the next transformer in the loop. The conductor 24 extends from the body portion 14 of the bushing and is connected to one end of a high voltage winding 47 of a transformer coil. The other end of the winding 47 being connected to ground potential, as indicated at 48. The secondary winding 49 of the transformer is connected through the casing 42 in some conventional manner to three terminals indicated as 50.

As seen from the description of the figures hereinbefore this invention has provided a unitary high voltage and high current bushing, molded from a suitable resin such as filled epoxy or rubber which provides a convenient means for connecting a high voltage (of the order of 7200 volts) and high current (of the order of 200 amps) line to a plurality of distribution transformers in a loop circuit arrangement without taking the line current through the casing of the transformer. It is also seen that the bushing provides a means for fusing each individual transformer without interrupting the circuit to the previous transformer or to the succeeding transformer.

I claim:

1. A high voltage bushing on a metal casing for connecting a high voltage and high current electrical circuit to electrical apparatus positioned in the casing, said bushing comprising a flange portion resting on the casing, a body portion, said flange portion being located outside the casing and said body portion being located inside the casing, first and second terminal means on said flange portion for electrically connecting a conductor to said bushing, first circuit means located in said flange portion electrically connecting said first and second terminal means in such manner that current may flow from said first terminal means to said second terminal means without entering said casing, second circuit means in the body portion of said bushing electrically connected to said first circuit means, voltage pick-up means located in the body portion of said bushing and surrounding said second circuit means in the body portion of said bushing, circuit means connected from said voltage pick-up means to a test terminal located on the flange portion of said bushing, and third circuit means connected to said second circuit means for connecting to apparatus located in the casing.

2. The apparatus of claim 1 wherein said bushing has a continuous opening through the flange and the body portion and said circuit means in the body portion of said bushing comprises a fuse located in the opening in said bushing, said fuse having one contact member for making electrical contact with the said first means connecting said first and second terminal means and another contact for making electrical contact with said third means for connecting to electrical apparatus located in the casing, said fuse being attached to a fuse holder which may be inserted into the opening from the flange side of said bushing.

References Cited

UNITED STATES PATENTS

| | | | |
|---|---|---|---|
| 3,422,392 | 1/1969 | Woods | 338—129 |
| 1,490,419 | 4/1924 | Eby | 174—142 |
| 2,281,073 | 4/1942 | Leonard | 337—202 X |
| 2,937,253 | 5/1960 | Smith | 337—202 X |
| 3,071,672 | 1/1963 | Mitchell | 174—18 |
| 3,244,838 | 4/1966 | Astleford | 337—202 X |
| 3,348,180 | 10/1967 | Leonard et al. | 174—18 X |
| 3,299,235 | 1/1967 | Leonard | 337—202 X |
| 3,345,483 | 10/1967 | Leonard et al. | 337—202 X |
| 2,782,391 | 2/1957 | Kirk | 339—205 |

BERNARD A. GILHEANY, Primary Examiner

H. B. GILSON, Assistant Examiner

U.S. Cl. X.R.

174—152; 317—15